(12) United States Patent
Meinlschmidt et al.

(10) Patent No.: US 12,364,270 B2
(45) Date of Patent: Jul. 22, 2025

(54) METHOD AND DEVICE FOR INCREASING THE PROPORTION OF MEAT USED IN FISH, POULTRY OR OTHER MEAT PRODUCTS

(71) Applicant: Nordischer Maschinenbau Rud. Baader GmbH + Co. KG, Lübeck (DE)

(72) Inventors: Pia Meinlschmidt, Lübeck (DE); Peter Ripphausen, Lübeck (DE); Torsten Rusko, Lübeck (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 920 days.

(21) Appl. No.: 17/425,451

(22) PCT Filed: Jan. 24, 2019

(86) PCT No.: PCT/EP2019/051681
§ 371 (c)(1),
(2) Date: Jul. 23, 2021

(87) PCT Pub. No.: WO2020/151822
PCT Pub. Date: Jul. 30, 2020

(65) Prior Publication Data
US 2022/0095634 A1    Mar. 31, 2022

(51) Int. Cl.
| | | |
|---|---|---|
| A22C 25/14 | (2006.01) |
| A22C 17/00 | (2006.01) |
| A22C 17/04 | (2006.01) |
| A22C 21/00 | (2006.01) |
| A23J 1/00 | (2006.01) |
| A23L 17/00 | (2016.01) |

(52) U.S. Cl.
CPC .............. *A22C 25/14* (2013.01); *A22C 17/00* (2013.01); *A22C 17/04* (2013.01); *A22C 21/0069* (2013.01); *A23J 1/00* (2013.01); *A23L 17/70* (2016.08)

(58) Field of Classification Search
CPC .......... A23L 17/70; A23L 13/60; A23L 13/72; A23L 13/67; A23L 13/00; A22C 17/004; A22C 25/16; A22C 9/001; A22C 21/0069; A22C 17/0053; A22C 25/14
USPC ................ 426/332, 644, 643, 641, 246, 281
See application file for complete search history.

(56) References Cited

U.S. PATENT DOCUMENTS

| | | | |
|---|---|---|---|
| 2,827,383 A | 3/1958 | Gorton, Jr. | |
| 4,301,180 A | 11/1981 | Simon et al. | |
| 4,539,210 A | 9/1985 | O'Connell et al. | |
| 4,960,599 A * | 10/1990 | Cozzini | A23B 4/28 |
| | | | 426/652 |
| 5,965,191 A | 10/1999 | Katayama et al. | |
| 9,491,956 B2 | 11/2016 | Kelleher et al. | |
| 2003/0108655 A1 | 6/2003 | Ishifune | |
| 2005/0095327 A1 | 5/2005 | Cozzini | |
| 2008/0159875 A1 | 7/2008 | Wilke | |
| 2011/0052770 A1 | 3/2011 | Perdersen | |
| 2013/0236626 A1 | 9/2013 | Brackenridge et al. | |

FOREIGN PATENT DOCUMENTS

| | | | |
|---|---|---|---|
| CL | 48652 B1 | 10/2012 | |
| CN | 1174495 A | 2/1998 | |
| CN | 1391445 A | 1/2003 | |
| CN | 1430473 A | 7/2003 | |
| CN | 1663400 A | 9/2005 | |
| CN | 101884417 A | 11/2010 | |
| CN | 102639013 A | 8/2012 | |
| CN | 103237464 A | 8/2013 | |
| CN | 104223133 A | 12/2014 | |
| CN | 107529800 A | 1/2018 | |
| DE | 3231733 A1 | 3/1983 | |
| EP | 0770336 A1 | 5/1997 | |
| EP | 0974273 A1 | 1/2000 | |
| JP | H082274 B2 * | 1/1996 | ............. A23L 1/318 |
| WO | 8400283 A1 | 2/1984 | |
| WO | 0056178 A1 | 9/2000 | |
| WO | 01/08512 A1 | 2/2001 | |
| WO | 2007046891 A2 | 4/2007 | |
| WO | 2016162523 A1 | 10/2016 | |

OTHER PUBLICATIONS

JP H082274 B2, Machine Translation, Jan. 17, 1996, pp. 1-3 (Year: 1996).*
International Search Report dated Apr. 4, 2019; International Application No. PCT/EP2019/051681.
Duan Junyang, General Regulations for Food Quality and Safety Market Access (2004 Edition), 1 page.
Examination Report mailed Apr. 12, 2023 in Canadian Patent Application No. 3125363.

* cited by examiner

*Primary Examiner* — Hong T Yoo
(74) *Attorney, Agent, or Firm* — DINSMORE & SHOHL LLP

(57) ABSTRACT

A method is used in the production of principal products conveyed in plurality along a processing line, consisting of fish, poultry or other meat which contains, in addition to the principal products to be obtained, inedible components to be removed (removal components) and also contains edible by-products remaining on said removal components. The edible by-products remain on the removal components after removal. The method includes: loading a separating device with a batch of fish, poultry or other meat; separating the principal products of this batch from the removal components, comprising by-products, of said batch; separating the by-products from the removal components; producing a by-product brine from the by-products by comminuting the by-products and mixing with water and stabiliser; and injecting a defined quantity of the by-product brine into the principal products, wherein principal products and the by-products contained in the by-product brine come from the same batch.

11 Claims, 1 Drawing Sheet

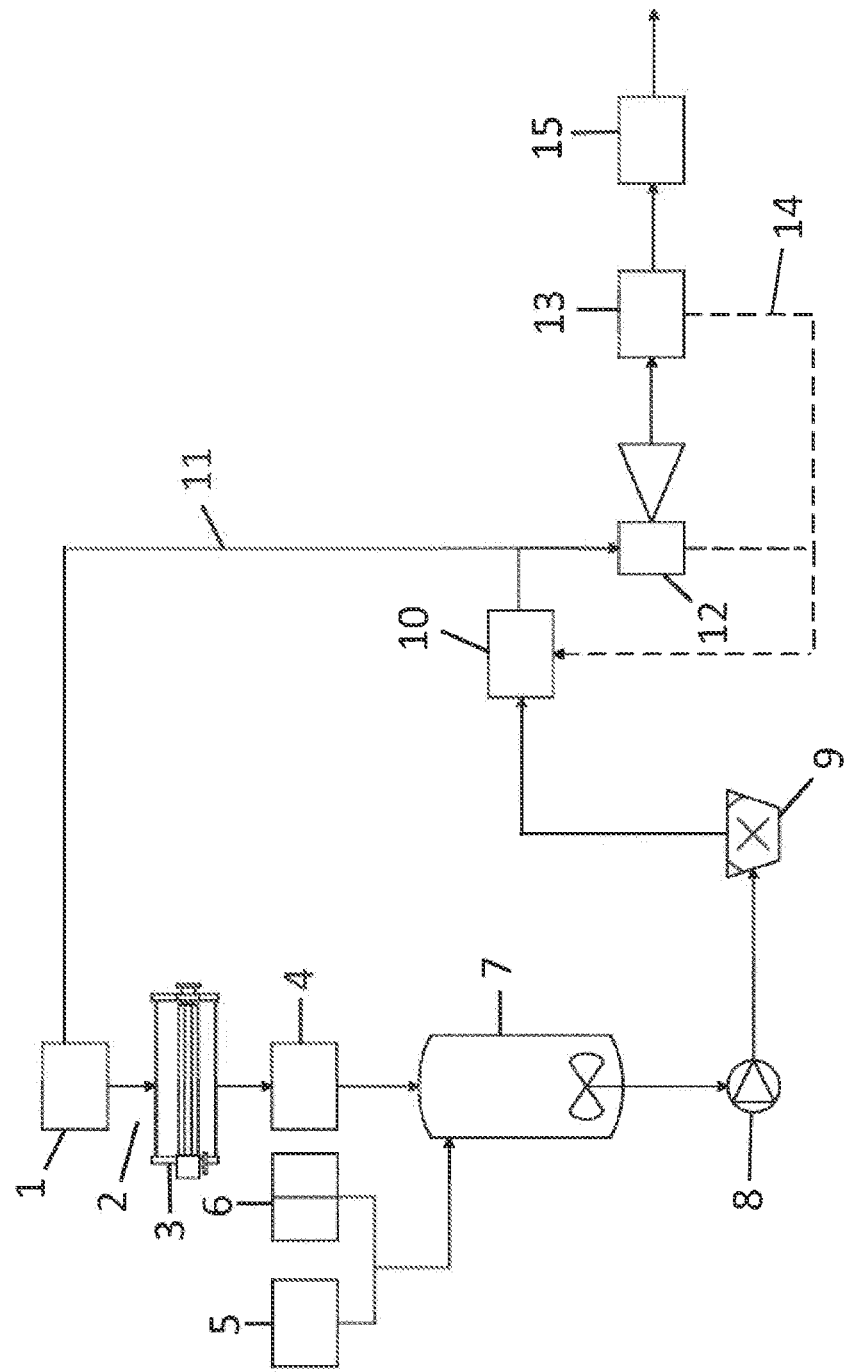

METHOD AND DEVICE FOR INCREASING THE PROPORTION OF MEAT USED IN FISH, POULTRY OR OTHER MEAT PRODUCTS

CROSS-REFERENCE TO RELATED APPLICATIONS

This application is a US National Phase of PCT/EP2019/051681 filed Jan. 24, 2019, the entire contents of which is hereby incorporated by reference.

FIELD OF THE INVENTION

The present invention relates to a method for processing principal products of any kind and form conveyed in plurality along a processing line and consisting of fish, poultry or other meat. These are meat products which contain, in addition to the principal products to be obtained, inedible components or components to be excluded from consumption which are to be removed (removal components) of at least one kind and also contain edible by-products remaining on said removal components, the edible by-products remaining on the removal components when the removal components are removed from the principal products.

BACKGROUND OF THE INVENTION

In the meat processing industry, the processing of animals gives rise, on the one hand, to desired parts which should be obtained (principal products) and, on the other hand, to the residual parts. The latter, in turn, are divided into parts to be excluded from consumption which are to be removed (removal components) and edible by-products. In this context, the expression "to be excluded from consumption" refers to the form in which the products are present immediately after removal from the desired parts. Such removable parts to be excluded from consumption are, for example, bones or cartilage, blood, heads, internal organs and, depending on the animal species, possibly also scales and/or skin, fins or belly flaps. These are inedible in their original form, even though they may be fit for consumption after appropriate processing, in the case of bones, for example, to gelatine. The edible by-products include, in particular, meat that remains on the bones during removal but also fat, for example. The term "meat" as used in the present invention includes fish, poultry as well as meat from any other animal, such as in particular pig, cow, lamb or game.

The focus in meat processing at present is usually on the principal products. It is a matter of ensuring the greatest possible yield from them. Thus, methods for removing the principal components from the removal components are constantly being further improved to maximise the proportion of principal products and minimise the proportion of edible by-products.

Methods are also known to increase the weight and/or nutrient content of the principal products by means of additives such as water, fats, proteins or other substances. Such methods are described, for example, in DE 32 31 733 A1 or U.S. Pat. No. 8,048,461 B2.

The by-products are predominantly high-quality meat which is discharged and becomes a by-product purely due to the fact that it is not possible to remove it one hundred percent from the removal components. As a result, high-quality meat is often not used at present for human consumption, but is processed into animal feed, for example.

SUMMARY OF THE INVENTION

Particularly in light of responsible food handling, it appears that a rethink is urgently required. The quantity of raw material/raw goods, i.e. animal meat, is limited. This limited and high-quality raw material must be used as efficiently as possible, particularly to ensure that we can continue to adequately supply the world's rapidly growing population with proteins in the future. The object of the present invention was therefore to provide a method and an apparatus for carrying out this method with which it becomes possible to better utilise the high-quality components of an animal, while at the same time increasing the quality of the products obtained, particularly in respect of appearance and flavour.

This object is achieved by a method such as is described herein. Advantageous developments of the subject-matter of the invention are also described. In addition, the invention comprises a product obtainable according to the method as well as an apparatus for carrying out the method.

Accordingly, the invention relates to a method for increasing the proportion of utilized meat in the production of principal products of any kind and form conveyed in plurality along a processing line and consisting of fish, poultry or other meat which contains, in addition to the principal products to be extracted, inedible components or components to be excluded from consumption which are to be removed (removal components) of at least one kind and also contains edible by-products remaining on said removal components, the edible by-products remaining on the removal components when the removal components are removed from the principal products, said method comprising the following steps:
  loading a separating device with a batch of fish, poultry or other meat;
  separating the principal products of this batch from the removal components, comprising by-products, of said batch;
  separation of by-products from the removal components;
  producing a by-product brine from the by-products by comminuting the by-products and mixing same with water, stabiliser, optionally sodium chloride and optionally other components;
  injecting a defined quantity of the by-product brine produced in step d) into the principal products, wherein principal products and by-products contained in the by-product brine come from the same batch.

Thus, within the context of the present invention, the inventors provide a method that enables more comprehensive use of the components of an animal within the scope of the high-quality principal product and thus increases the yield of principal product. The fact that the by-product used originates from the same batch as the principal product additionally ensures that, in the event of quality problems, only the one batch is affected and, for example, in the event that quality defects are found in the principal product, it is not necessary to painstakingly determine where the by-products of this batch have ended up.

As stated hereinbefore, the method according to the invention can be used and is suitable for meat of any animals. Thus, poultry, for example, can be processed using the method according to the invention, but also beef or pork. The present invention is particularly suitable for fish, the principal product being fish fillet and the component to be removed being the backbone of the fish. To a large extent, fish is processed by machines. However, despite increasingly refined methods for removing the fillets from the backbone, by-products arise which it is desirable to use as a high-quality product.

Both whole animals and animal bodies which have already been subjected to one or a plurality of processing steps as well as animal portions can be considered as starting products for the method.

Ideally, all the by-product is returned to the principal product in this manner. However, it is of course equally possible for only portions of the by-product to be added to the principal product, for example, if food regulations require this or make it appear expedient.

Loading of the separating device (step a)) preferably takes place mechanically but manual loading is also possible. Whole animal bodies can be processed in the separating device. Similarly, it is possible that a process (removal of viscera, heading) has already taken place before loading of the separating device.

Depending on the animal species processed, it may be advantageous for separation of the principal products (step b)) to be done manually by humans rather than by machine. This is still common, for example, in particular for poultry or, in the case of fish, for tuna. The method according to the invention also includes such processes where one or a plurality of steps are carried out manually.

As a result of separation (step c)), the by-product is obtained in the form of particles. The product thus obtained is also referred to as mince. Depending on the animal species, one speaks, for example, of fish mince or poultry mince. The average size of the particles obtained after separation depends similarly on the animal species and preferably ranges from 2 mm to 8 mm.

The method is particularly advantageous if step d) of the method includes the steps d1) of mixing by-product, water, stabiliser, optionally sodium chloride and optionally other components and d2) of comminuting the by-product brine to a maximum mean particle size of 3 mm, in particular of 2 mm, especially preferably of 1 mm.

A mean minimum particle size of 1 μm, in particular 0.5 mm, is also advantageous.

This particle size ensures good injectability with simultaneously reliable uptake of the by-product brine in the principal product. This means that the brine is retained in the principal product, even in further processing steps, whether during production up to the ready-for-sale end product or subsequently during use by the end consumer, for example during cooking or frying.

Depending on the animal species, it can be advantageous to carry out another step of pre-cleaning the by-product between step b) and step c). In the case of white fish, for example, it is desirable, before separating, to remove blood vessels which remain on the by-products when they are separated from the principal products and can impair the quality of the by-products. The same applies to the black belly flap skin and/or the fins which may result in undesirable contamination due to their colour.

The principal products, during the steps c) of separation and d) of producing the by-product brine, are preferably subjected in a parallel step f) to further processing, this step f) of further processing comprising in particular at least one process selected from trimming, skinning, portioning, sorting and aligning.

In this way it is possible to adjust the principal product to the requirements of the customer. This includes a required size but also the presence or removal of the skin. In addition, further refinement of the principal product can be carried out in this way. If the animal to be processed is fish, for example, further processing of the so-called standard fillets, which are obtained by removing the backbone, is possible by trimming to produce a pin-bone-free fillet. Alignment can be particularly helpful for the step of injecting so that the fillets are positioned in the best possible way for penetration of the injection needles.

Furthermore, it is advantageous if step e) of injecting the by-product brine is followed by a step g) of cleaning the injected principal product by removing excess by-product brine, in particular by means of at least one of the removal methods of suction, rinsing, wiping and blowing away. On the one hand, it is possible in this way to return any excess by-product brine and thus re-use it which reduces the losses and further increases the sustainability of the method. On the other hand, in this way the quality, in particular the visual quality, of the product is increased since excess by-product brine can cause stains or a slimy coating on the principal product which result in the consumer perceiving the product as inferior.

After cleaning, a further step of deep freezing the finished products can follow.

Preferably, with the method according to the invention, all method steps are carried out at a temperature of at most 10° C., in particular less than 7° C. and preferably from 0 to 6° C., especially preferably from 1 to 6° C. On the one hand, such temperature control ensures that the brine to be injected is sufficiently flowable to guarantee good injection. On the other hand, the preferred temperature range is below the temperature at which the proteins of fish coagulate. This ensures that only native, i.e. not denatured, proteins are processed which further enhances the quality of the product.

The pH value is a further parameter with which the method according to the invention can be advantageously influenced. The pH value of the by-product brine is advantageously from 5.0 to 9.0, in particular from 6.0 to 8.0, especially suitably from 6.0 to 7.0 and preferably from 6.0 to 6.5. Exceptionally preferably, it is 6.45. The tolerance in each case is +/−0.03. With such a pH value, a by-product brine is obtained that is particularly stable and particularly easy to inject.

In a further especially preferred embodiment, two principal products are processed in parallel, the principal products originating from the same animal. To increase sales, it is advantageous to process more than one principal product at the same time. In principle, any numbers of principal products can be processed in parallel, for example by conveying them side by side on a conveyor belt. For the injection process, however, it has been found that accuracy diminishes if the number of products processed simultaneously is too high, i.e. there is a possibility that the quantity of by-product brine to be injected is not ideal for each principal product. Therefore, the parallel processing of a maximum of four, in particular two, principal products is particularly suitable. When processing two principal products which originate from the same animal, it is additionally advantageous that these products normally have very similar properties, including a very similar weight. The requirements for the quantity of by-product brine to be injected are therefore also very similar for such two principal products which leads to good results with accurate dosing.

For the by-product brine, the by-products removed from the removal components are mixed with water, at least one stabiliser, optionally sodium chloride and optionally other components. In this case, the water is preferably ice water. As a result, it is easily possible to adjust the temperature to the temperature range of less than 10° C. which is preferred for the process. Moreover, temperature increases in the course of the process, such as those that occur during comminution, can be compensated. If the addition of sodium chloride is desired, sea salt can be used in preference. Sodium chloride is preferably added in a quantity that equates to the NaCl content of the principal product into which the by-product brine is to be injected, such that no change in flavour occurs in this respect due to the by-product brine. Likewise, it is possible to add any other quantity of sodium chloride desired by the customer.

After mixing the components of the by-product brine, it is subjected to a comminution process. In the course of this, the brine is comminuted to the extent that it can readily be injected. The maximum particle size in this case is determined in particular by the diameter of the injection needles. On the other hand, the particle size has an effect on the viscosity of the by-product brine. The maximum mean particle size after comminution is preferably 3 mm, in particular 2 mm and especially preferably 1 mm. Certain values have also been found to be particularly suitable with regard to the minimum size of the particles. Thus, a mean minimum particle size of 1 μm, in particular 0.5 mm, is especially preferred.

The viscosity of the by-product brine must enable correct injection of the by-product brine into the principal products. Thus, particularly in the case of fish, it must be ensured that when the by-product brine is injected, there is no increase in temperature, due to high viscosity and the pressure which is then required to force the brine through the needles, which causes the brine temperature to exceed 7° C. because this would result in undesirable denaturation of the fish proteins. A preferred range of the dynamic viscosity at 5° C. is from 1.52 m*Pa*s to $10^4$ m*Pa*s, in particular from 10 m*Pa*s to $10^3$ m*Pa*s. The measurement is performed in this case at a temperature of 5° C. and a pH value of 6.45.

The comminution process takes place in a fine comminuting device which can also be referred to as a dispersion device. In particular, it may be an emulsifying device.

The stabiliser used for the by-product brine is preferably phosphate-free. As phosphates have come under criticism as risk factors for cardiovascular disease, it is advantageous that their use can be dispensed with in the present invention.

Further preferably, the stabiliser is at least a compound selected from the group comprising of hydrocolloids, proteins, emulsifiers, special starches, functional salts, functional lipids and enzymes.

Hydrocolloids to be mentioned in particular are: alginates, xanthan gum, cellulose, in particular CMC (carboxymethyl cellulose) and hydroxypropyl cellulose, pectin, agar-agar, carrageenan, locust bean gum, guar gum, konjac or tara gum, gelatine and dextranes.

Soy proteins as well as egg and whey proteins are particularly suitable proteins.

Suitable emulsifiers are in particular lecithins and mono- and diglycerides of fatty acids.

Examples of special starches are dextrin, acetylated starch, acetylated distarch adipate, hydroxypropyl starch, distarch glycerol or acetylated oxidised starch.

Functional salts include in particular carbonates, acetates, citrates, ascorbates and the salts or sulphates of dicarboxylic acids and hydroxy acids.

Particularly suitable as functional lipids are phospholipids such as lecithin, mono- and diglycerides, glycolipids, sorbitan (mono) fatty-acid esters marketed under the name "Span", and in particular polyoxyethylene sorbitan fatty-acid esters (polysorbates) marketed under the names "Tween", "Scattics" or "Alkest", for example.

Other components that can optionally be added to the by-product brine include, in particular, seasonings, flavourings, artificial colours or antioxidants. Ascorbic acid or isoascorbic acid and their respective salts, carnosol, carnosolic acid as well as citric acid, tartaric acid, ethylenediaminetetraacetic acid and their respective salts may serve as antioxidants.

As far as the preferred quantity of injected by-product brine per principal product is concerned, this depends on various factors such as, in particular, the type of product, the sensory assessment of the product, but also food legislation requirements. Thus, for an addition of by-product brine in the range of up to 10 wt % of the total weight of the injected principal product, an improvement in the sensory properties is observed with increasing by-product brine so that from this aspect an addition of between 4 and 10 wt %, in particular 7 to 9.5 wt %, is especially preferred. On the other hand, according to food legislation, additions of less than 5 wt % of water are currently not subject to declaration, so that in this respect an addition of by-product brine in a quantity such that the added water content is less than 5 wt % is especially preferred.

Especially advantageously, the by-product brine has the following composition:
68 to 95 wt %, preferably 75 to 90 wt %, in particular 80 to 85 wt %, water
0.1 to 2 wt %, preferably 0.4 to 1.5 wt %, in particular 0.5 to 1 wt %, stabiliser
5 to 30 wt %, preferably 10 to 25 wt %, in particular 15 to 20 wt %, by-product
0 to 1 wt % sodium chloride
0 to 2 wt % other components The by-product brine can be produced either in batch operation or continuously.

Injecting the by-product brine takes place preferably with a pressure from 0.4 to 2.0 bar, in particular from 0.8 to 1.8 bar, and especially preferably at 1.6 bar.

The method steps of the method according to the invention are coordinated or synchronised with each other such that production of the by-product brine takes place in parallel with any other processing steps and transport of the principal products.

In this way, it is possible for the by-product brine which is injected into the principal products to contain by-products that originate from the same batch as the principal products. A batch can have a wide range of sizes. In particular, a batch can correspond to the animals processed during a production shift, as cleaning of the plant usually takes place after a shift so that a defined time for a change is predetermined by external circumstances. A batch change is easier to perform for the branch of the principal products than for the by-products and the by-product brine, since cleaning of the devices used for the latter (separation device, mixing device, comminuting device) is significantly more time-consuming and elaborate than for the former. Therefore, it is alternatively conceivable that, if more frequent batch changes are desired, more than one line is available for the by-products/by-product brine, so that an immediate change can take place without having to wait for cleaning. This can then take place while the next batch is processed in parallel on the second by-product line.

In a preferred embodiment, the synchronisation of principal and by-product line is based on quantity control depending on the quantity of by-product to be included in the by-product brine.

The product path of the principal products and/or by-products can be tracked by means of suitable sensor and/or observation means, so that it is known at any time or even continuously where a particular principal product is located.

Advantageously, the principal products can be weighed before and/or after the step of injecting. In particular, weighing takes place both before injecting and also afterwards. In this way, it is possible to accurately check how much by-product brine has entered the principal product. Weighing after injecting also takes place preferably after any cleaning step is carried out, so that only the quantity of brine that is also actually contained in the end product is detected. The weighing results can be used to derive feedback for production of the brine. Thus, for example, the proportion of by-product can be increased or decreased if a certain weight is not reached or exceeded.

The present invention also relates to a product made of fish, poultry or other meat, obtainable by the method according to the invention. As described previously, such products are particularly high in terms of taste. In addition, they are less wasteful of resources because they enable maximum utilisation of the high-quality meat for the purposes of the principal product.

Finally, the present invention relates to an apparatus for increasing the proportion of meat used in the production of principal products of any kind and form conveyed in plurality along a processing line and consisting of fish, poultry or other meat for carrying out the method according to the invention, comprising:
- a separating device for separating inedible components or components to be excluded from consumption, which are to be removed (removal components) from the principal products of this batch, from the removal components of this batch which comprise edible by-products;
- a by-product line with
- a separation device for separation of the by-products from the removal components;
- a mixing device for mixing the by-products with water, stabiliser, optionally sodium chloride and optionally other components to produce a by-product brine;
- a comminuting device for further comminuting the by-products in the by-product brine;
- a first transport means system with at least one transport means for transporting the by-products from the separating device via the separation device, the mixing device and the comminuting device to an injection device;
- an injection device for injecting a defined quantity of the comminuted by-product brine into the principal products,
- a principal product line with
- a second transport means system with at least one transport means for transporting the principal products from the separating device to the injection device; and
- synchronising means for synchronising the conveying speed in the by-product line and the conveying speed in the principal product line in such a manner that the by-products contained in the by-product brine, which is injected into the principal products in the injection device, originate from the same batch as the principal products.

The synchronisation means ensure that production of the by-product brine takes place in parallel with any other processing steps and transport of the principal products. The synchronisation means can be designed, for example, as a quantity control.

The injection device comprises a plurality of injection needles which pierce the meat and through which the by-product brine is injected. The injection needles must have a diameter that is large enough to inject the brine without becoming clogged. On the other hand, the diameter should be as small as possible to minimise damage to the principal product or preferably to prevent it completely. The preferred diameter of the injection needles is from 0.5 to 3 mm, in particular from 1 to 2 mm.

The principal product line preferably has at least one further device for processing the principal product, in particular at least one device selected from trimming device, skinning device, portioning device, sorting device and aligning device. Such additional devices make it possible to produce a principal product that is specifically adjusted to the customer's requirements.

In addition, it is advantageous if the apparatus further has a cleaning device which is downstream of the injection device, the cleaning device comprising a cleaning means, selected from suction means, rinsing means, wiping means and blowing away means. This allows the removal of any by-product brine that may be present.

BRIEF DESCRIPTION OF THE DRAWING

Especially preferred embodiments of the method according to the invention and the apparatus are explained in greater detail with reference to the attached drawing. The drawing shows:

FIG. 1 is a flow diagram for the method according to the invention.

DETAILED DESCRIPTION OF THE INVENTION

When taken on their own or in combination with each other, the features and developments described below illustrate preferred embodiments. It is expressly pointed out that features which are summarised in the description and/or the drawing or are described in a common embodiment can also further develop the method according to the invention and the apparatus according to the invention in a functionally independent manner.

The invention is described below based on the example of salmon processing. The principal product is salmon fillet.

The salmon fillets are removed from the backbone on a separating device 1. The heads are removed from the fish body in a preceding step in a heading device that is not shown. In addition, the viscera have already been removed on entering the separating device 1. From the separating device 1, the backbones with the salmon meat (by-product) still attached to them are further processed on the by-product line 2. First, the backbone with the by-product is fed to a separation device 3. The temperature during the separation process is below 10° C. The by-product of salmon meat is separated from the backbone in the separation device. On leaving the separation device, the so-called fish mince has a particle size between 2 and 6 mm. The fish mince can be routed to a temporary store 4 for temporary storage. The temperature in the temporary store 4 is lower than 10° C., a temperature between 4 and 5° C. is particularly suitable.

The fish mince is fed from the temporary store 4 to the mixing device 7. In this mixing device, the fish mince is mixed with ice water from water tank 5 as well as with the stabiliser and salt from the container 6 for stabiliser and dry components. Salt need not necessarily be added. It is equally possible for further dry components to be added. The ice water solution which is fed to the mixing device 7 has a pH value ranging from 7 to 8. Fish mince and ice water solution are mixed in the mixing device 7. The temperature in the mixing device is lower than 5° C. The pH value ranges from 6 to 8. The composition of the salmon brine was as follows:

81.4 wt % water
18% salmon mince
0.6 wt % stabiliser

HydroTOP SB 15 by the Hydrosol company was used as a stabiliser.

The salmon brine thus produced arrives in the comminuting device 9 via the pump 8. Here, the brine is comminuted to a particle size of 1 to 2 mm. The temperature of the brine rises by up to 3 K due to the comminution process. From the comminuting device 9, the fish brine is conveyed to the injection tank 10. Here, the fish brine is cooled so that it has a temperature of below 7° C., in particular of 5 to 6° C.

Parallel to production of the fish brine, the salmon fillets are conveyed on the principal product line 11. In doing so, they can be transported straight to the injection device 12. Similarly, it is also possible that they pass through further method steps and the corresponding devices (not shown) before being injected. The fillets can thus be further refined, for example by trimming, i.e. by removing further bones and/or ventral fins and/or the back fat. Skinning is another option.

Before entering the injection device 12, the salmon fillets are weighed on a weighing device (not shown). In the injection device 12, the fish brine is then injected into the fish fillets via injection needles. This takes place at a pressure ranging from 0.4 to 2.0 bar. Any excess fish brine is returned to the injection tank 10 via a recirculation loop 14. After injection, the fish fillets usually have excess fish brine. On the one hand, this is detrimental to the visual impression, on the other hand, fish brine is consumed without being permanently present in the product, since fish brine on the surface is removed during washing and in particular during cooking or frying. The fish fillet is therefore fed to the cleaning device 13 where the fillet is cleaned. This can be carried out using a so-called air knife with which water is first applied and then sucked off together with the excess brine. The excess brine is also returned to the injection tank via the recirculation loop 14.

After cleaning, the fish fillet is weighed again on a weighing device (not shown) before being deep-frozen in a freezing device 15.

The invention claimed is:

1. A method of increasing a proportion of meat used in a production of principal products of any kind and form conveyed in plurality along a processing line and comprising fish, poultry or other meat, which contains
   the principal products that are to be obtained,
   removal components that are inedible and/or to be excluded from consumption, and
   edible by-products that remain on said removal components, wherein the edible by-products remain on the removal components when the removal components are separated from the principal products,
   said method comprising the following steps, wherein all steps are carried out at a temperature from 1 to 6° C.:
   a) loading a separating device with a batch of meat comprising fish, poultry or other meat;
   b) separating principal products of the batch from removal components, comprising edible by-products, of said batch;
   c) separating the edible by-products from the removal components;
   d) producing a by-product brine from the edible by-products by comminuting the by-products and mixing the edible by-products with water and stabiliser; and
   e) injecting a defined quantity of the by-product brine produced in step d) into the principal products, wherein the principal products and the edible by-products contained in the by-product brine come from the same batch.

2. The method according to claim 1, wherein the step d) of producing the by-product brine comprises the following steps:
   d1) mixing the edible by-products, the water and the stabilizer; and
   d2) comminuting the by-product brine to a maximum mean particle size of 3 mm, or 2 mm, or 1 mm.

3. The method according to claim 1, wherein, during the steps c) of separating and d) of producing the by-product brine, the principal products are subjected to a parallel step f) of further processing, wherein the step f) of further processing comprises at least one process selected from trimming, skinning, portioning, sorting, or aligning.

4. The method according to claim 1, wherein the step e) of injecting the by-product brine is followed by a step g) of cleaning the injected principal product by removing excess by-product brine by at least one removal method selected from of sucking, rinsing, wiping, or blowing away.

5. The method according to claim 1, wherein the batch of meat is fish, the principal products are fillets of the fish and the removal components are backbones of the fish.

6. The method according to claim 1, wherein a pH value of the by-product brine is from 6.0 to 8.0, or 6.0 to 7.0, or 6.0 to 6.5, or is 6.45.

7. The method according to claim 1, wherein two principal products are processed in parallel, wherein the principal products originate from the same animal.

8. The method according to claim 1, wherein the stabiliser is phosphate-free.

9. The method according to claim 1, wherein the stabiliser is at least a compound selected from the group consisting of hydrocolloids, proteins, emulsifiers, special starches, functional salts, fibres, dietary fibres, functional lipids and enzymes.

10. The method according to claim 1, wherein the step d) of producing the by-product brine from the by-products by comminuting the edible by-products and mixing the edible by-products with the water and the stabiliser further comprises mixing the edible by-products with the water and the stabiliser, and sodium chloride and/or other components.

11. The method according to claim 1, wherein the step d) comprises producing the by-product brine from the edible by-products by comminuting the edible by-products after mixing the edible by-products with the water and the stabiliser.

* * * * *